(12) United States Patent
Cuisinier (10) Patent No.: US 12,500,227 B2
(45) Date of Patent: Dec. 16, 2025

(54) ENCAPSULATED ELECTROACTIVE MATERIALS FOR USE IN RECHARGEABLE AQUEOUS ZINC CELLS AND BATTERIES AND METHODS OF PREPARING ENCAPSULATED ELECTROACTIVE MATERIALS

(71) Applicant: Salient Energy Inc., Dartmouth (CA)

(72) Inventor: Marine B. Cuisinier, Dartmouth (CA)

(73) Assignee: Salient Energy Inc., Dartmouth (CA)

( * ) Notice: Subject to any disclaimer, the term of this patent is extended or adjusted under 35 U.S.C. 154(b) by 800 days.

(21) Appl. No.: 17/773,440

(22) PCT Filed: Oct. 30, 2020

(86) PCT No.: PCT/CA2020/051466
§ 371 (c)(1),
(2) Date: Apr. 29, 2022

(87) PCT Pub. No.: WO2021/081658
PCT Pub. Date: May 6, 2021

(65) Prior Publication Data
US 2022/0376231 A1   Nov. 24, 2022

Related U.S. Application Data

(60) Provisional application No. 62/927,738, filed on Oct. 30, 2019.

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/244* (2013.01); *H01M 4/625* (2013.01); *H01M 10/26* (2013.01);
(Continued)

(58) Field of Classification Search
None
See application file for complete search history.

(56) References Cited

U.S. PATENT DOCUMENTS

2007/0120095 A1* 5/2007 Gruner ................ H10K 85/221
  252/500
2018/0123133 A1* 5/2018 Muldoon ............. H01M 10/052

FOREIGN PATENT DOCUMENTS

| CN | 102110858 A | * | 6/2011 | |
| CN | 110105872 A | * | 8/2019 | ........... C09D 183/08 |
| WO | WO-2016197236 A1 | * | 12/2016 | ........... H01M 10/36 |

OTHER PUBLICATIONS

Machine translation of CN 110105872 A, published on Aug. 9, 2019 (Year: 2019).*

(Continued)

*Primary Examiner* — Anca Eoff
(74) *Attorney, Agent, or Firm* — Own Innovation; James W. Hinton; Daniel Biggs (57) ABSTRACT

Provided is encapsulated electroactive materials for use in rechargeable aqueous zinc cells, batteries, systems, and associated methods. A core-shell composite particle includes a core of electrochemically active material, and a shell of a polyelectrolyte matrix, substantially insoluble in water, yet allowing the transport of zinc cations to and from the electrochemically active core. A method for preparing the core-shell composite electrochemically active particle includes mechanically dispersing the electrochemically active material particles in association with the polyelectrolyte solution, insolubilizing the polyelectrolyte in the presence of the dispersed electrochemically active material particles, washing the encapsulated particles particle with water, and drying the washed encapsulated particles.

20 Claims, 5 Drawing Sheets

(51) Int. Cl.
  H01M 4/24      (2006.01)
  H01M 4/62      (2006.01)
  H01M 10/26     (2006.01)

(52) U.S. Cl.
  CPC ............ H01M 2004/028 (2013.01); H01M 2300/0082 (2013.01); H01M 2300/0085 (2013.01)

(56) References Cited

OTHER PUBLICATIONS

Machine translation of CN102110858 A, published on Jun. 29, 2011 (Year: 2011).*

Cui, L., Li, J., Zhang, X-G.—Synthesis and characterization of core-shell nanostructured PPy/V2O5 composite, Material Letters 63 (2009), pp. 683-685 (Year: 2009).*

CIPO as ISA, International Search Report and Written Opinion for PCT/CA2020/051466, Jan. 15, 2021.

Dannert et al: "Nanoparticle-Hydrogel Composites: From Molecular Interactions to Macroscopic Behavior", Polymers (Basel), vol. 11, issue 2, Feb. 2019.

Galceran et al. "Sol-gel modified Pechini method for obtaining nanocrystalline KRE(WO4)2 (RE = Gd and Yb)", Journal of Sol-Gel Science Technology, vol. 42, Jan. 1, 2007.

Han: "Functionalized Vanadium Oxide as the Cathode Material for Rechargeable Aqueous Zinc-ion Batteries", Master of Applied Science Dissertation, University of Waterloo, Jan. 2020.

Lapitsky: "ionically crosslinked polyelectrolyte nanocarriers: Recent advances and open problems", Current Opinion in Colloid and Interface Science, vol. 19, issue 2, Mar. 31, 2014.

Qin et al.: "Polypyrrole Wrapped V2O5 Nanowires Composite for Advanced Aqueous Zinc-Ion Batteries", Frontiers in Energy Research, vol. 8, article 199, Aug. 2020, pp. 1-6.

Wulandari et al.: "Preparation and Characterization of Chitosan-coated Fe3O4 nanoparticles using Ex-Situ Co-Precipitation Method and Tripolyphosphate/Sulfate as Dual Crosslinkers", IOP Conf Series: Materials Science and Engineering, vol. 299, 2018.

Xu et al.: "Conformal Conducting Polymer Shells on V2O5 Nanosheet Arrays as a High-Rate and Stable Zinc-Ion Battery Cathode", Advanced Material Interfaces, vol. 6, issue 2, Jan. 22, 2019.

* cited by examiner

FIG. 1

Comp. Example 1   Example 1   Example 2   Example 3

ENCAPSULATED ELECTROACTIVE MATERIALS FOR USE IN RECHARGEABLE AQUEOUS ZINC CELLS AND BATTERIES AND METHODS OF PREPARING ENCAPSULATED ELECTROACTIVE MATERIALS

CROSS-REFERENCE TO PRIOR APPLICATIONS

This application is a National Stage entry under 35 USC 371 of the International Application No. PCT/CA2020/051466 filed on Oct. 30, 2020, which claims priority to the provisional application No. 62/927,738 filed on Oct. 30, 2019.

TECHNICAL FIELD

This disclosure relates generally to secondary electrochemical cells (hereafter, cells) that use metallic zinc as the negative electrode, and in particular to zinc-ion cells that use metallic zinc in the negative electrode and an electrochemically active material capable of intercalating zinc cations in the positive electrode.

INTRODUCTION

Primary and secondary electrochemical cells employing zinc metal have been used in commercial applications for well over a century. Zinc is inexpensive, non-toxic, is stable in water due to a high overpotential for hydrogen evolution and has a low redox potential (−0.76 V vs. standard hydrogen electrode (SHE)) compared to other negative electrode materials used in aqueous batteries.

The most common of these cells have been primary (i.e. non-rechargeable) cells that use an alkaline electrolyte and a metal oxide positive electrode material that reacts with hydroxide ions in the electrolyte. To allow for this type of reaction, the battery must employ a very alkaline electrolyte. However, the use of an alkaline electrolyte limits the rechargeability of the cell. Therefore, developing a zinc-based battery that operates in a neutral or acidic pH electrolyte is of significant interest because it may provide improved rechargeability. Modern examples of rechargeable zinc cells operating with electrolytes having pH<7 include zinc-air, zinc-ion, zinc-bromide, zinc-iodide, zinc-iron and zinc-cesium.

A rechargeable zinc-ion cell includes a positive electrode material that can reversibly intercalate zinc ions. Since zinc ions carry a 2+ charge, they are surrounded by a tightly coordinated solvent shell that greatly increases the effective ionic radius of the zinc ion compared to monovalent (1+) cations such as lithium, sodium, and potassium. Therefore, zinc intercalation materials are designed to facilitate movement of the solvated zinc ion and its solvent shell through the material in order to avoid an energy barrier associated with desolvation.

One drawback and challenge for near neutral pH water-based secondary batteries is to control the diffusion and subsequent loss of transition metal cations formed during cycling. During discharge in a water-based electrolyte, electrochemically active materials such as transition metal oxides may reduce into cations that tend to be solvated in the electrolyte and do not return to the positive electrode during the charge cycle. This is especially true for vanadium and manganese-based oxides. Dissolution causes mass loss of active material upon cycling, and therefore progressive capacity fading, but also significant mechanical stress on the positive electrode as the volume occupied by the electrochemically active material diminishes via dissolution. Eventually, the positive electrode may also fail suddenly by overcharge—in the case of vanadium-based electrochemically active materials, for example—or by mechanical collapse of the composite film architecture.

The issue of dissolution is not as severe in alkaline electrolytes, since transition metal ions precipitate as hydroxides or oxides above a given pH. For example, the reduction product of $MnO_2$ in alkaline electrolyte is MnOOH, which is insoluble; whereas in neutral pH, $Zn_xMnO_2$ tends to disproportionate into $MnO_2$ and aqueous $Mn^{2+}$.

So far, battery researchers developing positive electroactive materials for the Zn-ion battery have employed a variety of methods to alleviate the issue of dissolution. Typically, the positive electrode composite film is cast at a very low area loading onto a highly porous carbon-based current collector that can adsorb transition metal cations and serve as a conducting matrix so that active material is not lost upon dissolution. In this configuration, however, when the active material loading is increased, the carbon matrix cannot accommodate all the dissolved electroactive transition metal cations and capacity fading is severe. In addition, Zn-ion cells are typically cycled under an extremely high current density, i.e. at a fast cycling rate, so that electroactive ions cannot diffuse out of the positive electrode. Zn-ion cells cycled at a low current density (i.e. slow rate) exhibit aggravated capacity fading as the outwards diffusion of electroactive transition metal cations prevails over adsorption onto the positive electrode conductive matrix.

Other methods that have been employed to inhibit the dissolution of electroactive materials include the use of so-called "water-in-salt" electrolytes in which the water molecules are bound to the electrolyte salt under the form of complexes and therefore unavailable to solvate the electroactive material ($ZnCl_2$ "Water-in-Salt" Electrolyte Transforms the Performance of Vanadium Oxide as a Zn Battery Cathode, authors: Lu Zhang Ismael A. Rodríguez-Pérez Heng Jiang Chong Zhang Daniel P. Leonard Qiubo Guo Wenfeng Wang Shumin Han Limin Wang Xiulei Ji, Advanced Functional Materials Volume 29, Issue 30, 24 May 2019; doi: 10.1002/adfm.201902653, hereby incorporated by reference in its entirety).

Conventionally, the positive electrodes as described above operate at electrochemically active material loadings of less than or equal to 1 $mg/cm^2$, and the zinc-ion cells are cycled at rates faster than 2C (full discharge in less than a half-hour). Thus, there is a need for an electrochemically active material which allows for high utilization at high loadings such as 10 to 20 $mg/cm^2$, and operability at slower cycling rate such as C/4 to C/10 (full discharge in four to ten hours) in order to produce zinc-ion batteries commercially viable for stationary storage applications.

Accordingly, there is a need for improved rechargeable aqueous zinc cells and batteries and materials for use therein.

SUMMARY

A composite particle for use in a positive electrode is provided. The composite particle includes: a core comprising electrochemically active material; and a shell encapsulating the core and comprising a polyelectrolyte matrix, wherein the shell is substantially insoluble in water and allows for the transport of zinc cations to and from the core.

The polyelectrolyte matrix may comprise any one or more of polyvinyl alcohol (PVA), alginate, carrageenan, chitosan, polyethyleneimine (PEI), poly-L-lysine (PLL), poly-l-arginine (PLA), poly(amidoamine) (PAMAM), poly-styrenesulfonate (PSS), poly-styrenesulfonic acid-co-maleic acid (PSSA-MA), and Nafion.

The polyelectrolyte matrix may comprise a mixture of at least two polyelectrolytes.

The polyelectrolyte matrix may comprise a plurality of polyelectrolyte layers.

The shell may have a content that is from 0.1% to 4% by weight of a total weight of the core.

A positive electrode is also provided. The positive electrode includes a conductive substrate and an active material layer disposed on the conductive substrate. The active material layer includes a plurality of encapsulated electrochemically active particles, at least one conductive carbon, and a binder. Each respective one of the plurality of encapsulated electrochemically active particles includes a core of electrochemically active material and a shell encapsulating the core and comprising a polyelectrolyte matrix, wherein the shell is substantially insoluble in water and allows for the transport of zinc cations to and from the core.

The plurality of encapsulated electrochemically active particles may have a content that is from 45% to 95% by weight of a total weight of the active material layer, the binder may have a content that is from 2% to 10% by weight of the total weight of the active material layer, and the at least one conductive carbon may have a content that is from 3% to 45% by weight of the total weight of the active material layer, wherein the sum of the content by weight of the plurality of encapsulated electrochemically active particles, the binder, and the at least one conductive carbon does not exceed 100%.

The encapsulated electrochemically active particles may have a content that is from 45% to 95% by weight of a total weight of the active material layer.

The encapsulated electrochemically active particles may have a content that is from 65% to 95% by weight of a total weight of the active material layer.

The encapsulated electrochemically active particles may have a content that is from 80% to 90% by weight of a total weight of the active material layer.

The conductive carbon may have a content is from 3% to 30% by weight of a total weight of the active material layer.

The conductive carbon may have a content that is from 5% to 15% by weight of a total weight of the active material layer.

The electrochemically active material may have a loading from 1.0 $mg/cm^2$ to 50 $mg/cm^2$.

The electrochemically active material may have a loading from 15 $mg/cm^2$ to 25 $mg/cm^2$.

A battery is also provided. The battery includes: a negative electrode comprising zinc, the zinc providing an active source of zinc ions; an electrolyte comprising a zinc salt dissolved in water; and a positive electrode. The positive electrode includes a conductive substrate and an active material layer disposed on the conductive substrate. The active material layer includes a plurality of encapsulated electrochemically active particles, at least one conductive carbon, and a binder. Each respective one of the plurality of encapsulated electrochemically active particles includes a core of electrochemically active material and a shell encapsulating the core and comprising a polyelectrolyte matrix, wherein the shell is substantially insoluble in water and allows for the transport of zinc cations to and from the core A method of preparing encapsulated particles for use in a positive electrode is provided. The method includes: mechanically dispersing a plurality of electrochemically active material particles in association with a first polyelectrolyte solution comprising a first polyelectrolyte; and insolubilizing the first polyelectrolyte in the presence of the mechanically dispersed plurality of electrochemically active material particles to generate the encapsulated particles, wherein each respective one of the encapsulated particles comprises a core of electrochemically active material and a shell encapsulating the core, wherein the shell comprises a matrix of the first polyelectrolyte, and wherein the shell is substantially insoluble in water and allows for the transport of zinc cations to and from the core.

The method may include washing the encapsulated particles with water.

The method may include drying the washed encapsulated particles in air at a temperature below the boiling point of water.

Insolubilizing the first polyelectrolyte may include adding a crosslinking agent to the first polyelectrolyte solution to insolubilize the first polyelectrolyte at room temperature in the presence of the mechanically dispersed plurality of electrochemically active material particles.

The first polyelectrolyte may include an acidic functional group comprising a polyelectrolyte acid, and the insolubilizing the polyelectrolyte may include: adding a crosslinking agent comprising an alcohol functional group to the first polyelectrolyte solution in the presence of the mechanically dispersed plurality of electrochemically active material particles, the alcohol functional group comprising an alcohol; evaporating the water at a temperature less than 100° C. to form a gel; and drying the gel at a temperature above 100° C. to promote polyesterification between the polyelectrolyte acid and the alcohol.

The method may include adding a second layer to the shell by: mechanically dispersing the encapsulated particles in association with a second polyelectrolyte solution comprising a second polyelectrolyte; and insolubilizing the second polyelectrolyte in the presence of the encapsulated particles to add a second polyelectrolyte layer to the shell of the encapsulated particles. The second polyelectrolyte may be the same as the first polyelectrolyte.

According to some embodiments, there is a core-shell composite particle, comprising a core of electrochemically active material, and a shell of a polyelectrolyte matrix, substantially insoluble in water, yet allowing the transport of zinc cations to and from the electrochemically active core.

The polyelectrolyte of the shell may be selected from the group of polyvinyl alcohol (PVA), alginate, carrageenan, chitosan, polyethyleneimine (PEI), poly-L-lysine (PLL), poly-l-arginine (PLA), poly(amidoamine) (PAMAM), poly-styrenesulfonate (PSS), poly-styrenesulfonic acid-co-maleic acid (PSSA-MA), Nafion, and any combination thereof.

The encapsulation matrix of the shell may further include a mixture of polyelectrolytes or a sequence of polyelectrolyte layers.

A content of the polyelectrolyte encapsulation shell may be from 0.1% to 4% by weight of the total weight of the electrochemically active core material.

According to some embodiments, there is a method for preparing the core-shell composite electrochemically active particle. The method includes mechanically dispersing the electrochemically active material particles in association with the polyelectrolyte solution, insolubilizing the polyelectrolyte in the presence of the dispersed electrochemically active material particles, washing the encapsulated particles with water, and drying the washed encapsulated particles in air at moderate temperature.

The method for insolubilizing of the polyelectrolyte may include preparing a precursor solution of at least one polyelectrolyte, mechanically dispersing the electrochemically active material particles in association with the polyelectrolyte solution, and adding a crosslinking agent dropwise to the precursor aqueous solution to insolubilize the polyelectrolyte at room temperature in the presence of the dispersed electrochemically active material particles.

The method for insolubilizing of the polyelectrolyte may include preparing a precursor aqueous solution of at least one polyelectrolyte with acidic functional groups, mechanically dispersing the electrochemically active material particles in association with the polyelectrolyte solution, adding a crosslinking agent with alcohol functional groups to the precursor aqueous solution in the presence of the dispersed electrochemically active material particles, evaporating the water at moderate temperature (i.e. below the boiling point of water, <100° C.) to form a gel, and then drying the gel above 100° C. for the polyesterification between the polyelectrolyte acid and the alcohol to proceed.

The encapsulation process may be repeated from 1 to 3 times to obtain a shell structure comprising multiple layers.

According to some embodiments, there is a positive electrode comprising a conductive substrate, and an active material layer on the substrate, comprising a multiplicity of encapsulated electrochemically active particles as described herein, at least one conductive carbon, and a binder.

A content of the composite encapsulated electrochemically active particles in the active material layer may be from 45 to 95% by weight. A content of the binder may be from 2 to 10% by weight. A content of the conductive carbon may be from 3 to 45% by weight. The weight % may be relative to a total weight of the active material layer. The content of the encapsulated electrochemically active particles in the active material layer may preferably be from 65 to 95% by weight and most preferably from 80 to 90% by weight. The content of the conductive carbon may preferably be from 3 to 30% by weight and most preferably from 5 to 15% by weight.

A loading of electrochemically active material may be from 1.0 mg/cm$^2$ to 50 mg/cm$^2$. Preferably, a loading of active material on the positive electrode may be from 15 mg/cm$^2$ to 25 mg/cm$^2$.

According to some embodiments, there is a battery, comprising a negative electrode comprising zinc as an active source of zinc ions, an electrolyte comprising a zinc salt dissolved in water; and a positive electrode as described herein.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

As used herein, the terms "from" and "between", when used in reference to a range of values (such as, for example, a content percentage by weight or an ionic conductivity), mean the range inclusive of the lower limit value and upper limit value, unless otherwise stated.

The present disclosure relates generally to improving the performance of secondary electrochemical cells that use zinc metal as the negative electrode in a neutral or acidic electrolyte, and in particular to zinc-ion cells that use an electrochemically active material capable of inserting zinc cations as the positive electrode.

An object of the present disclosure is to provide a composite polyelectrolyte encapsulated material suitable for utilization as a positive electrochemically active material which is capable of high areal loading and is stabilized against dissolution in near-neutral pH water-based electrolytes. Polyelectrolytes are polymers whose repeating units bear an electrolyte group. These groups dissociate in aqueous solutions such as zinc-ion electrolytes, making the polymers charged. This allows for zinc ionic conduction across the polyelectrolyte, which is an essential characteristic for the proper functioning of the zinc-ion battery.

Another object of the present disclosure is to provide a positive electrode containing a polyelectrolyte encapsulated active material which allows for high areal loading and utilization and is suitable for a battery having high capacity and long cycle life.

Another object of the disclosure is to provide a zinc-ion battery which has sufficient capacity and lifetime to be a viable commercial solution for stationary storage applications. In particular, the desired beneficial effects of using such polyelectrolyte encapsulated electroactive materials in the positive electrode of zinc-ion cells can comprise the following: i) improved capacity retention over extended cycling, even under low current densities (i.e. slow cycling rate), ii) improved capacity retention and material utilization over a wide range of areal loading, iii) lower self-discharge when the zinc-ion cell is rested in a partially discharged or fully discharged state, iv) diminished anodic corrosion as the electroactive material at the positive electrode is not in direct contact with the water-based electrolyte.

It is an object of the present disclosure to provide an encapsulation shell to electrochemically active particles in a positive electrode so as to substantially render them insoluble in water and water-based electrolytes. By impeding dissolution, the original morphology of the encapsulated positive active material can be preserved, and deleterious reactions (such as corrosion) caused by the presence of transition metal cations in the electrolyte can be avoided. This, in turn, can result in increased capacity and energy retention, diminished self-discharge and thus prolonged cycle-life.

To address the need for stabilizing the particle-electrolyte interface over the cycle-life of the zinc-ion battery—up to 10 or 20 years for stationary storage applications—methods to form a water-insoluble encapsulation shell around the electrochemically active particles are described in an aspect of the disclosure.

When the positive electrode electroactive material is encapsulated within a polyelectrolyte matrix, then its dissolution by prolonged contact with water or water-containing electrolyte is significantly reduced.

Thus, a first embodiment of the present disclosure provides a core-shell composite particle, comprising: a core of electrochemically active material and a shell of a polyelectrolyte matrix, substantially insoluble in water, yet allowing the transport of zinc cations to and from the electrochemically active core.

Figure 1:
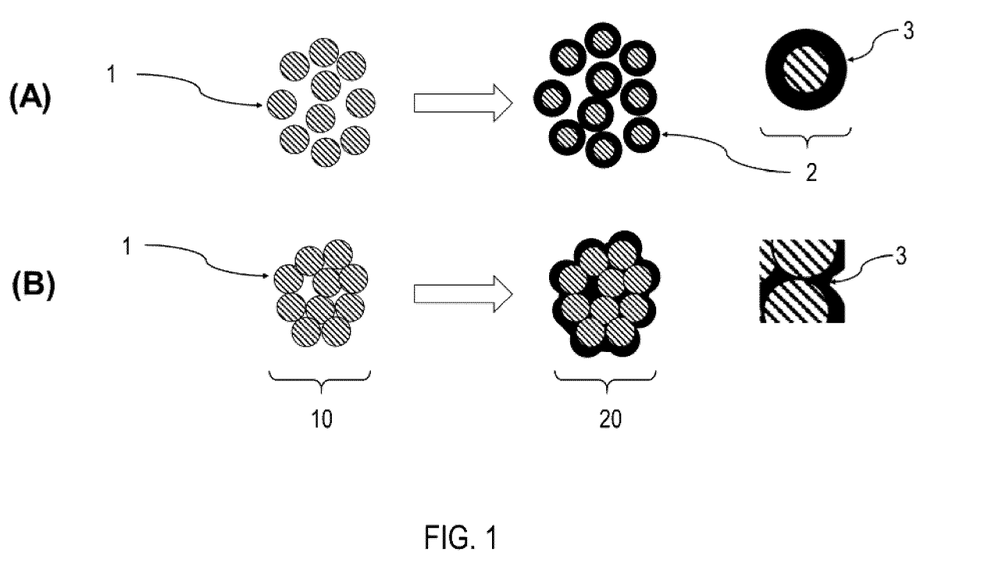
FIG. 1 is a schematic representation of an electrochemically active material in a powder form, existing either as primary particles (1) or secondary particle aggregates (10) each comprising primary particles, according to embodiments. As shown in the expanded panels, encapsulation within a polyelectrolyte layer (3) can be performed on either coated primary particles (2) or secondary aggregates (20) in which case the porosity between the primary particles may be filled by polyelectrolyte (3).

FIG. 1 depicts the morphology of the pristine and polyelectrolyte encapsulated particles, in accordance with an embodiment. In the case of isolated particles (A, 1), the method described in the present disclosure may result in isolated encapsulated particles (2). In addition to the outer surface of the electrochemically active particle, the polyelectrolyte matrix (3) may substantially fill in the inner nanoporosity of the electrochemically active particle (not depicted). In the more common instance where the electrochemically active material exists as secondary aggregates (B, 10), the method typically results in encapsulated aggregates (20) in which the polyelectrolyte matrix covers the external surface of the aggregate, particle-to-particle porosity, and inner nanoporosity of each primary particle.

By applying a dense polyelectrolyte layer, which selectively allows the transport of ionic species, the exposure of the electrochemically active particle to free water molecules can be controlled. A polyanionic layer will favor diffusion of cations such as $Zn^{2+}$, while a polycationic layer will favor the diffusion of electrolyte anions such as $SO_4^{2-}$.

The encapsulation shell can include of one or more layers. Each layer can comprise one or more components which may include a polyelectrolyte, a glass, a ceramic and/or a cross-linking agent. At least one of these components can transport $Zn^{2+}$ ions in the solid state. Each layer of the encapsulation shell can comprise one or more zinc salts. Each layer of the encapsulation shell can comprise one or more additional filler components, which may provide the layer its mechanical properties, chemical stability, and decrease its porosity.

In an embodiment, the polyelectrolyte is a gel polymer electrolyte cross-linked with one or more electrolyte components. This may ensure the polyelectrolyte encapsulation layer remains substantially insoluble in water or near-neutral pH electrolytes. Examples of such polyelectrolytes are boric acid cross-linked polyvinyl alcohol (PVA), zinc alginate, and zinc kappa-carrageenan.

Other suitable polyelectrolytes include cross-linked chitosan, zinc-exchanged cross-linked poly-styrenesulfonate (PSS) or poly-styrenesulfonic acid-co-maleic acid (PSSA-MA), and any combination thereof.

In order to suppress dissolution, good interfacial adhesion to the electrochemically active particle is an important property. Polycations typically adhere better to the negatively charged surface of transition metal oxides. In addition to chitosan, suitable polycations include polyethyleneimine (PEI), poly-L-lysine (PLL), poly-l-arginine (PLA), and poly (amidoamine) (PAMAM). Low swelling (i.e. water uptake) also improves the interfacial adhesion and further limits water exposure.

Figure 2:
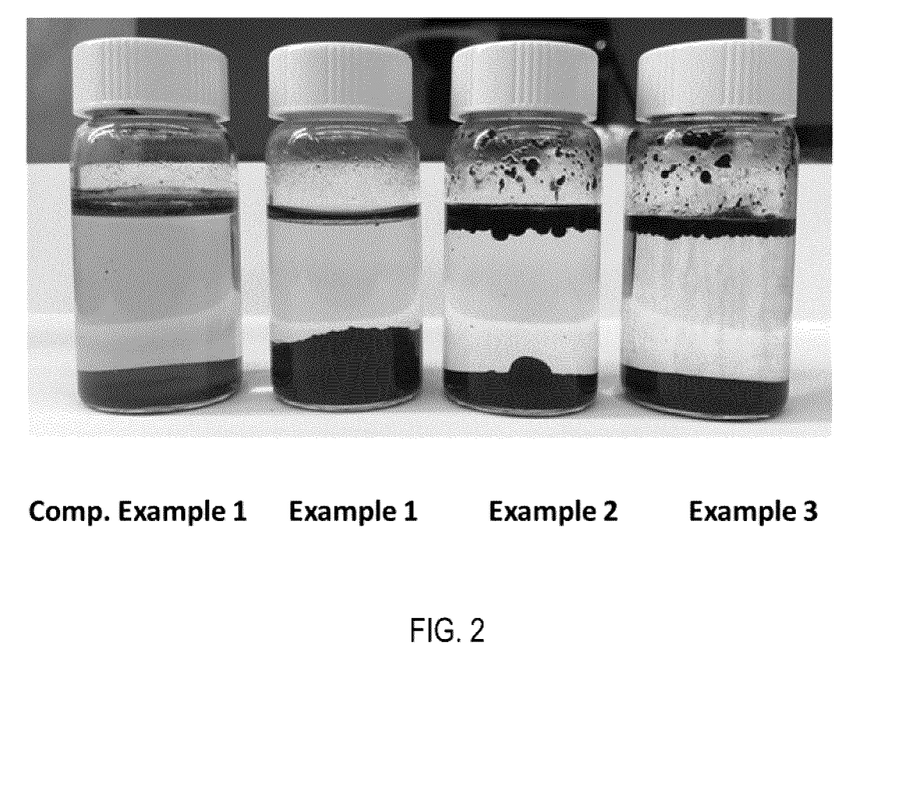
FIG. 2 shows solubility tests conducted on $Na_xV_2O_5(SO_4)_y \cdot nH_2O$ in water. Comparative Example 1 corresponds to the bare, as-prepared material and Examples 1-3 correspond to polyelectrolyte encapsulated materials.

FIG. 2 depicts a visual dissolution test, in which equal amounts of bare and encapsulated $NaxV_2O_5$ $(SO_4)$ $y \cdot nH_2O$ materials were subjected to deionized water. As evinced by the bare sample, this material is prone to dissolution in neutral pH solution and brightly colored $V^{5+}$ cations rapidly turn the solution yellow in the form of $VO_2^+$. It is an object of the present disclosure to suppress dissolution of active material particles, and examples 1 to 3 show how the leeching of vanadium ions in solution can be alleviated by proper surface modification. In Example 1, the supernatant is just as colored as in Comparative Example 1 (bare material) suggesting that this particular encapsulation was not effective. In contrast, Examples 2 and 3 show greater and greater degree of material stabilization vis a vis water.

In order to provide sufficient integrity to the encapsulated electrochemically active material, the encapsulation shell thickness is typically greater than the average roughness of the underlying electrochemically active material described above. This is particularly important in the case of hierarchical active materials made of small primary particles, such as represented in FIG. 1B.

In order to lower the cell internal resistance and increase the rate capability of the final electrochemical cell into which the encapsulated electrochemically active material is incorporated, the polymer gel encapsulation has a high ionic conductivity. In general, the ionic conductivity of the gel may be at least $10^{-7}$ S/cm, generally at least about $10^{-6}$ to $10^{-5}$ S/cm, and may be as high as $10^{-4}$ to $10^{-3}$ S/cm or higher. The thickness of the encapsulation shell may be preferably about 1 to 500 nanometers, or, where the ionic conductivity is about $10^{-7}$ S/cm, about 1 to 10 nm, or, where the ionic conductivity is between about $10^{-4}$ about $10^{-3}$ S/cm, about 1 to 500 nm, and more preferably between 1 and 50 nanometers, for example about 10 nanometers.

In a second embodiment, a method of preparing or forming the composite encapsulated electrochemically active particle (core-shell composite particle) of the first embodiment is provided.

The method may include designing a single-layer or multi-layer encapsulation shell. The designing may include selecting the components of each layer from one or more polymer(s), carbon(s), or ceramic(s) in order to achieve an encapsulated electrochemically active particle meeting both conductivity and mechanical requirements.

The method may include, for each layer of the encapsulation shell, mixing of the various precursor gel components along with the electrochemically active material (core material), using any of a variety of methods known in the art so long as the desired dissolution, dispersion, or suspension of the solid components is obtained in the carrier solvent(s). Suitable methods of mixing include, but are not limited to, mechanical agitation, grinding, ultrasonication, and ball milling.

The method may include, for each layer, cross-linking the polymer(s) in order to render them insoluble in water and near-neutral pH electrolytes. Cross-linking can be realized by, but not limited to, physical self-assembly. The physical crosslinking of monomers or preformed polymers typically results in weak electrostatic bonding. It is preferable in this case that the cross-linking agent be present in the electrolyte of the zinc-ion battery so as to maintain the cohesion of the encapsulation shell.

Alternatively, cross-linking can be realized by, but not limited to, chemical reaction (typically permanent, covalent bonding initiated by heat, pressure, change in pH, or irradiation). Chemical cross-linking can take the form of in situ sol-gel polymerization—such as polyesterification—for insolubilizing the polyelectrolyte. A known process is the 'Pechini method', that can be used to apply co-polyesters of citric acid with glycerol, ethylene glycol, polycaprolactone triol and others. The precursors are mixed together in a solution form and dried by evaporation to remove solvent(s). The resulting gel can be thermally cured to achieve insolubilization.

Alternatively, bulk polymerization of water-insoluble ionomers may be carried out from a solution by evaporating the organic solvent. This method may be used for applying a layer of perfluorosulfonic acid resin (Nafion), chloroprene rubber, polyvinylidene difluoride (PVDF) or fluoroethylene vinyl ether (FEVE).

After the polymer gel in insolubilized at the surface of the electrochemically active material, the core-shell composite may be washed thoroughly to remove any excess reagents or by-products, and further processed as desired (dried, sieved, etc). High energy grinding or crushing is however not recommended, as this may damage the encapsulation.

In a third embodiment, the present disclosure provides a positive electrode including a conductive substrate and an active material layer on the substrate. The active material layer comprises: a plurality of encapsulated electrochemically active particles of the first embodiment; at least one conductive carbon; and a binder. In a more explicit aspect of the third embodiment, a content of the composite encapsulated electrochemically active particles in the active material layer may be from 45 to 95% by weight; a content of the binder may be from 2 to 10% by weight; and a content of the conductive carbon may be from 3 to 45% by weight; wherein the weight % is relative to a total weight of the active material layer. The content of the encapsulated electrochemically active particles in the active material layer may preferably be from 65 to 95% by weight and most preferably from 80 to 90% by weight (wherein the weight % is relative to a total weight of the active material layer). The content of the conductive carbon may preferably be from 3 to 30% by weight and most preferably from 5 to 15% by weight (wherein the weight % is relative to a total weight of the active material layer).

Suitable binders which are chemically stable in the potential window of use of the cell may include thermoplastics and thermosetting resins. For example, polyethylene, polypropylene, polytetrafluoroethylene (PTFE), polyvinylidene fluoride (PVDF), styrene butadiene rubber, a tetrafluoroethylene hexafluoro ethylene copolymer, a tetrafluoroethylene hexafluoropropylene copolymer (FEP), a tetrafluoroethylene perfluoroalkyl vinyl ether copolymer (PFA), ethylene-tetrafluoroethylene copolymer (ETFE resin), polychlorotrifluoroethylene resin (PCTFE), a propylene-tetrafluoroethylene copolymer, an ethylene-chlorotrifluoroethylene copolymer (ECTFE). These binders may be used independently, or mixtures may be used.

The components may be wet blended in the presence of a suitable solvent or dry blended using a mortar and pestle or other conventionally known mixing equipment. The mixture may then be applied to a current collector by conventionally known methods. Any suitable current collector may be employed. The amount of mixture deposited on the current collector may be controlled by choice of draw bar or doctor blade selection. After drying the deposited mixture, the applied material may then be pressed to a set thickness.

The conductive carbon material may be carbon black, such as Ketjen black, Super P Li, Super C65, Vulcan XC72 and acetylene black, vapor grown carbon fiber, graphene, natural graphite, artificial graphite, such as Timrex KS-6, fullerenes, hard carbon, mesocarbon microbeads, carbon nanofibers, and activated carbon.

The positive electrode may be prepared by mixing the particles according to the above description with one or more binders and other materials to prepare a positive electrode structure. These materials may be mixed as a slurry, coated onto a metal foil, and dried. The methods of construction of a positive electrode employing an active material may be compatible with the particles of the embodiments described herein.

The positive electrode thus prepared may be employed in the construction of an electrochemical cell or battery. In an embodiment, the positive electrode may be combined with a negative electrode having a zinc metal as an active material.

In a fourth embodiment of the present disclosure, an apparatus is provided that comprises: a negative electrode; a positive electrode; an electrolyte for ionically coupling the negative electrode to the positive electrode; and a separator that is wetted by the electrolyte and prevents the electrodes from making physical contact. The negative electrode comprises zinc. The electrolyte comprises a zinc salt dissolved in water. The electrolyte may also comprise other salts, additives to control zinc plating and stripping, and additives that affect the viscosity of the electrolyte. The positive electrode comprises the encapsulated particles according to the present disclosure.

The negative electrode may be formed substantially of zinc metal. The negative electrode may be formed substantially of a zinc alloy.

The pH of the electrolyte may be between about 1 and 7 and may be preferably between 4 and 6.

The zinc salt may be dissolved so that zinc ions are present in the electrolyte in a range from 0.001 molar to 10 molar and preferably in a range from 0.1 molar to 4 molar.

The apparatus described herein can be used for the storage and delivery of electrical energy with a voltage in the range of 0.5-3 V.

Figure 3:
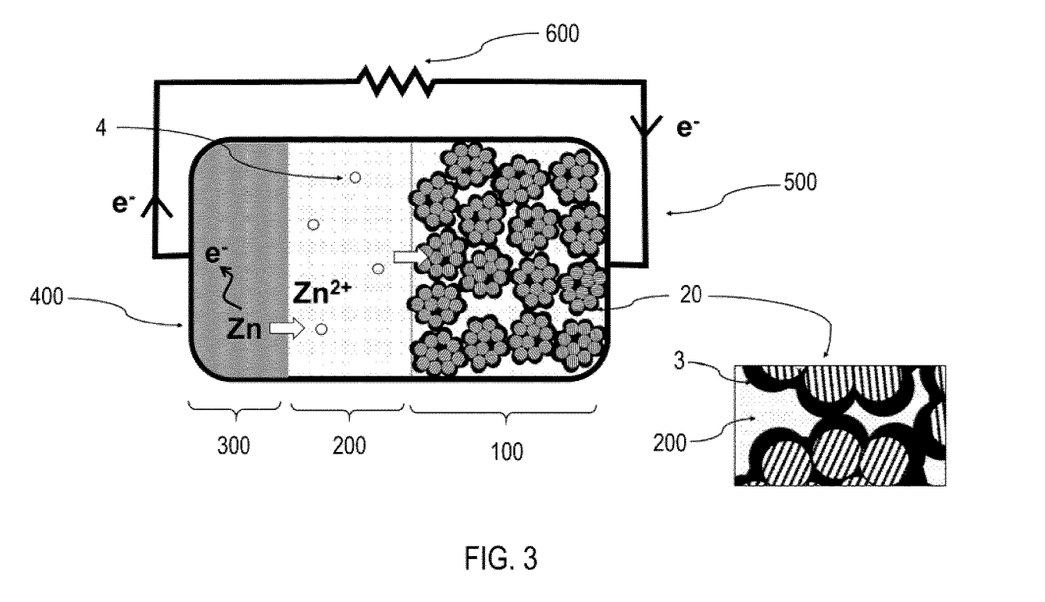
FIG. 3 is a schematic diagram of a zinc battery (400), wherein the polyelectrolyte encapsulated material (20) is used as the positive electrode active material (100), according to an embodiment. During discharge, the external circuit (500) delivers power to an electrical load (600). Electrons are supplied from the oxidation of zinc metal from the negative electrode (300) into zinc cations (4). These zinc cations solvate and migrate through the electrolyte (200) to intercalate in the positive electrode active material. The expanded panel shows how the interface between the encapsulated active material (20) and the electrolyte (200) includes the polyelectrolyte layer (3).

FIG. 3 shows a schematic of a zinc metal battery (400) during discharge under an electrical load (600), according to an embodiment. The zinc metal battery 400 includes a negative electrode 300, an electrolyte 200, and a positive electrode 100. At the negative electrode (300), zinc metal is oxidized into $Zn^{2+}$ cations (4) which solvate into the electrolyte (200). At the positive electrode (100), the redox active metal centers of the active material (20) are reduced by electrons transported through the external circuit (500), while solvated zinc cations (4) are inserted into the electrochemically active material (20). In a rechargeable zinc metal battery, both the oxidation of zinc metal (also referred to as stripping) and the $Zn^{2+}$ insertion are fully reversible. Upon charge, solvated $Zn^{2+}$ are de-inserted from the positive electrode material, diffuse through the electrolyte 200 and are reduced to zinc metal (also referred to as plating). While the components depicted in FIG. 3 are disposed directly on one another, it should be understood that other components may also be present. In particular, the electrolyte 200 may be absorbed within a separator layer not depicted in FIG. 3. Current collectors are also not depicted in FIG. 3 and may be present.

As depicted in FIG. 3, it is an object of the present disclosure to limit the direct exposure of the electrochemically active material (20) to the electrolyte (200). In the encapsulated material (20), the positive electrode/electrolyte interface comprises exclusively the polyelectrolyte layer (3).

Figure 4:
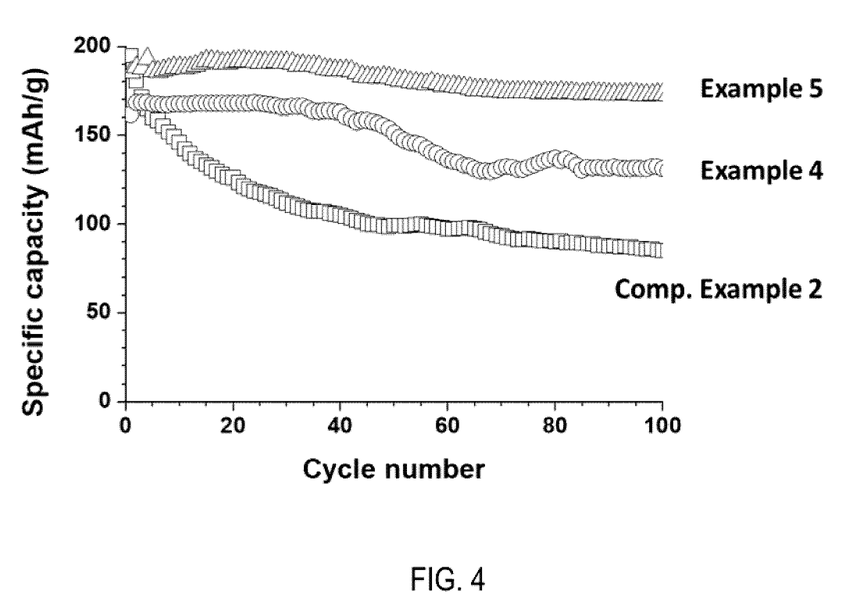
FIG. 4 shows the evolution of specific capacity vs cycle number for Zn-ion cells including a $MnO_2$ positive electrode, made of either bare particles (Comparative Example 2) or polyelectrolyte-encapsulated particles of the present disclosure (Examples 4 and 5). Cells were cycling galvanostatically at C/2 with a zinc foil negative electrode and a 1 M $ZnSO_4$ electrolyte.

FIG. 4 shows the effect of polyelectrolyte encapsulation on cycling of zinc-ion cells with a $MnO_2$ positive electrode, according to examples. When bare particles are used to fabricate the positive electrode (Comparative Example 2), specific capacity decreases from approximately 200 mAh/g to 80 mAh/g within 100 cycles owing to dissolution of the electrochemically active material in the discharged (i.e. reduced) state. Mn (+3) disproportionation to Mn (+4) (i.e. $MnO_2$) and soluble Mn (+2) is enabled by exposure to free water molecules in the electrolyte. In comparison, when polyelectrolyte-encapsulated particles are used in the positive electrode (Example 4 and Example 5), cells retain a specific capacity of 130 mAh/g and 180 mAh/g, respectively.

Figure 5:
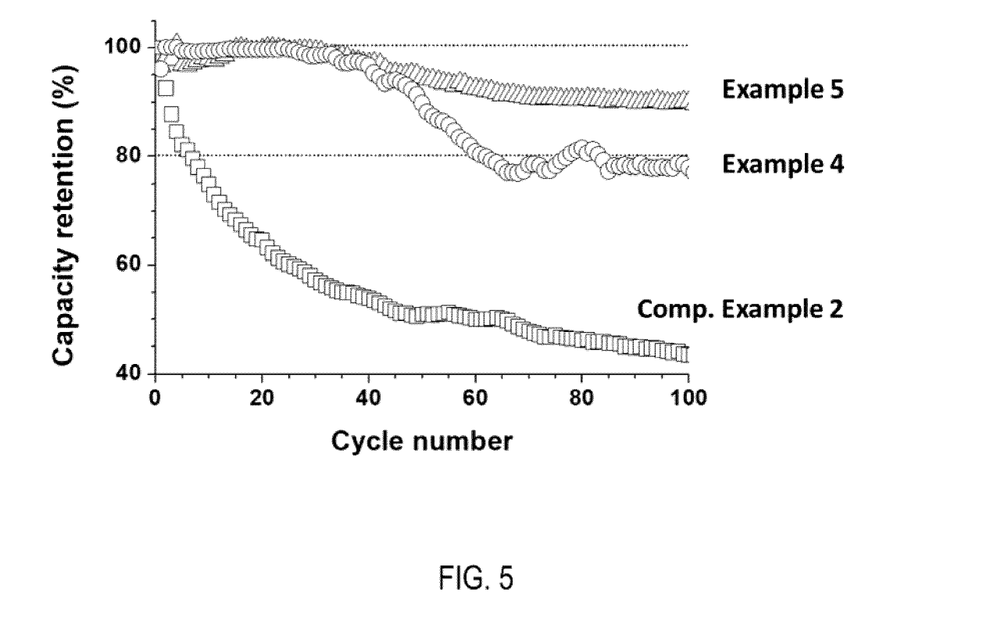
FIG. 5 shows the capacity retention vs cycle number for Zn-ion cells including a $MnO_2$ positive electrode, made of either bare particles (Comparative Example 2) or polyelectrolyte-encapsulated particles of the present disclosure (Examples 4 and 5). Cells were cycling galvanostatically at C/2 with a zinc foil negative electrode and a 1 M $ZnSO_4$ electrolyte.

FIG. 5 shows the same experimental results as FIG. 4 but plotted in terms of capacity retention. This representation makes it clearer that polyelectrolyte encapsulation enables Zn—$MnO_2$ cells to retain 78% and 91% of their initial capacity, in the cases described as Example 4 and Example 5, respectively; as compared to only 45% in the case of the bare particles. Long-term cyclability is possibly the single most important attribute for a battery intended for stationary storage applications.

In another aspect of the fourth embodiment, a zinc-ion battery having a loading of active material on the positive electrode from 1.0 $mg/cm^2$ to 50 $mg/cm^2$ is provided. In an embodiment, the loading of active material on the positive electrode may be from 5.0 $mg/cm^2$ to 30 $mg/cm^2$. In a preferred embodiment, the loading of active material on the positive electrode may be from 15 $mg/cm^2$ to 25 $mg/cm^2$.

EXAMPLES $Na_xV_2O_5(SO_4)_y \cdot nH_2O$ was prepared from sodium metavanadate ($NaVO_3$) and sulfuric acid ($H_2SO_4$) according to the method reported by Torardi et al. which is hereby incorporated by reference in its entirety (C. Torardi, C. Miao, M. Lewittes and Z. Li, "High lithium capacity $M_xV_2O_5A_y \cdot nH_2O$ for rechargeable batteries," Journal of Solid State Chemistry, vol. 163, pp. 93-99, 2002). The resulting product was a dark red powder.

Example 1. $Na_xV_2O_5(SO_4)_y \cdot nH_2O$ was encapsulated into a polyelectrolyte matrix comprising zinc alginate. In a typical procedure, 14.7 g of $Na_xV_2O_5(SO_4)_y \cdot nH_2O$ was dispersed in 20 ml of a sodium alginate aqueous solution (0.3 g) by ultrasonication for 30 minutes. The dispersion was then transferred into a 200 ml beaker, and 100 mL of a zinc sulfate aqueous solution (3 g) was added dropwise under strong magnetic stirring. Alginate crosslinking by zinc ions occurred immediately, however the suspension was left under magnetic stirring for 12 hours in the presence of a large excess of zinc sulfate to ensure the maximum crosslinking yield. The suspended powder was filtered and washed with distilled water to remove the unreacted soluble and extractable polymer, excess crosslinking agent and other impurities. After drying in air at 60° C., approx. 14.6 g of alginate encapsulated $Na_xV_2O_5(SO_4)_y \cdot nH_2O$ was recovered. For the purpose of a solubility experiment, 0.5 g of the encapsulated material were immersed in 15 ml deionized water, stirred for 48 h and let to rest.

Example 2. $Na_xV_2O_5(SO_4)_y \cdot nH_2O$ was encapsulated into a polyelectrolyte matrix comprising a lithium perfluorosulfonate resin. In a typical procedure, 14.7 g of $Na_xV_2O_5(SO_4)_y \cdot nH_2O$ was dispersed in 20 mL of an isopropyl alcohol solution of lithium perfluorosulfonate (0.3 g) by ultrasonication for 30 minutes. The dispersion was then transferred into a 200 ml beaker, and the isopropyl alcohol was evaporated at 80° C. under strong magnetic stirring until completely dry. Approx. 15.2 g of Nafion encapsulated $Na_xV_2O_5(SO_4)_y \cdot nH_2O$ were recovered. For the purpose of a solubility experiment, 0.5 g of the encapsulated material were immersed in 15 mL deionized water, stirred for 48 h and let to rest.

Example 3. $Na_xV_2O_5(SO_4)$ $y \cdot nH_2O$ was encapsulated into a polyelectrolyte matrix comprising an inner layer of chitosan and an outer layer of lithium perfluorosulfonate resin (lithiated Nafion). In a typical procedure, 14.7 g of $Na_xV_2O_5(SO_4)_y \cdot nH_2O$ were dispersed in 20 mL of 2 vol % acetic acid containing 0.2 g chitosan by ultrasonication for 30 minutes. The dispersion was then transferred into a 200 ml beaker, and 20 mL of a sodium tripolyphosphate aqueous solution (3 g) were added dropwise under strong magnetic stirring. Chitosan crosslinking by tripolyphosphate ions occurred within 2 hours. The suspended powder was filtered and washed with distilled water to remove the unreacted soluble and extractable polymer, excess crosslinking agent and other impurities. After drying in air at 60° C., the powder was redispersed in 20 mL of an isopropyl alcohol solution of lithium perfluorosulfonate (0.1 g) by ultrasonication for 30 minutes. The dispersion was then transferred into a 200 ml beaker, and the isopropyl alcohol was evaporated at 80° C. under strong magnetic stirring until completely dry. Approx. 14.2 g of Nafion-chitosan-encapsulated $Na_xV_2O_5(SO_4)_y \cdot nH_2O$ were recovered. For the purpose of a solubility experiment, 0.5 g of the encapsulated material were immersed in 15 mL deionized water, stirred for 48 h and let to rest.

Comparative Example 1. For the purpose of a solubility experiment, 0.5 g of the as-prepared $Na_xV_2O_5(SO_4)_y \cdot nH_2O$ material was immersed in 15 mL deionized water, stirred for 48 h and let to rest.

Example 4. Ultrafine electrolytic manganese dioxide (EMD) was obtained from Borman Specialty Materials. In a typical procedure, 14.6 g of EMD were dispersed in 20 mL of a polyvinyl alcohol (PVA) aqueous solution (0.4 g) by ultrasonication for 30 minutes. The dispersion was then transferred into a 200 mL beaker, and 100 mL of a boric acid aqueous solution (25 g) were added dropwise under strong magnetic stirring. PVA crosslinking by borate ions occurred immediately, however the suspension was left under magnetic stirring for 12 hours in the presence of a large excess of boric acid to ensure the maximum crosslinking yield. The suspended powder was filtered and washed with distilled water to remove the unreacted soluble and extractable polymer, excess crosslinking agent and other impurities. After drying in air at 60° C., approx. 15.0 g of PVA encapsulated EMD were recovered. In order to exacerbate dissolution of the active material, a low loading positive electrode was fabricated. The active material (0.9 g) was mixed with Vulcan XC72 carbon (0.9 g) and added to a suspension of polytetrafluoroethylene (PTFE) in isopropyl alcohol (0.2 g). The slurry was sonicated for 1 hour, and cast onto an AvCarb P50 carbon paper sheet used as the current collector. After drying in air at 60° C. for 12 hours, the areal loading in the positive electrode was approx. 2 mg ($MnO_2$)/$cm^2$. Zn—$MnO_2$ cells were assembled using 30 µm thick foil as the negative electrode, one layer of glass fiber filter membrane as the separator and 1 M $ZnSO_4$ as the electrolyte. Zn—$MnO_2$ cells were cycled galvanostatically on a Landt instrument between 1.8 V and 0.95V at a current density of 0.2 mA/$cm^2$.

Example 5. EMD was encapsulated into a polyelectrolyte matrix comprising zinc alginate. In a typical procedure, 14.7 g of EMD were dispersed in 20 mL of a sodium alginate aqueous solution (0.3 g) by ultrasonication for 30 minutes. The dispersion was then transferred into a 200 ml beaker, and 100 mL of a zinc sulfate aqueous solution (3 g) were added dropwise under strong magnetic stirring. Alginate crosslinking by zinc ions occurred immediately, however the suspension was left under magnetic stirring for 12 hours in the presence of a large excess of zinc sulfate to ensure the maximum crosslinking yield. The suspended powder was filtered and washed with distilled water to remove the unreacted soluble and extractable polymer, excess crosslinking agent and other impurities. After drying in air at 60° C., approx. 14.9 g of alginate encapsulated EMD were recovered. Positive electrode and Zn—$MnO_2$ cells were fabricated and tested according to the method described in Example 4.

Comparative Example 2. Ultrafine electrolytic manganese dioxide (EMD) was obtained from Borman Specialty Materials. Without any modification to the as-received material, positive electrode and Zn—$MnO_2$ cells were fabricated and tested according to the method described in Example 4.

While the above description provides examples of one or more apparatus, methods, or systems, it will be appreciated that other apparatus, methods, or systems may be within the scope of the claims as interpreted by one of skill in the art.

The invention claimed is:

1. A composite particle for use in a positive electrode, the composite particle comprising:
a core comprising electrochemically active material for inserting zinc cations; and
a shell encapsulating the core and comprising a polyelectrolyte matrix, wherein the shell is substantially insoluble in water and allows for the transport of the zinc cations to and from the core;
wherein the composite particle is prepared by mechanically dispersing an electrochemically active material particle in association with a first polyelectrolyte solution comprising a first polyelectrolyte, and insolubilizing the first polyelectrolyte, wherein insolubilizing the first polyelectrolyte comprises adding a crosslinking agent to the first polyelectrolyte solution.

2. The composite particle of claim 1, wherein the polyelectrolyte matrix comprises any one or more of polyvinyl alcohol (PVA), alginate, carrageenan, chitosan, polyethyleneimine (PEI), poly-L-lysine (PLL), poly-I-arginine (PLA), and poly(amidoamine) (PAMAM), poly-styrenesulfonate (PSS), poly-styrenesulfonic acid-co-maleic acid (PSSA-MA), and Nafion.

3. The composite particle of claim 1, wherein the polyelectrolyte matrix comprises a mixture of at least two polyelectrolytes.

4. The composite particle of claim 1, wherein the polyelectrolyte matrix comprises a plurality of polyelectrolyte layers.

5. The composite particle of claim 1, wherein the shell has a content that is from 0.1% to 4% by weight of a total weight of the core.

6. A positive electrode comprising:
a conductive substrate; and
an active material layer disposed on the conductive substrate, the active material layer comprising:
a plurality of encapsulated electrochemically active particles, each respective one of the plurality of encapsulated electrochemically active particles comprising:
a core of electrochemically active material for inserting zinc cations; and
a shell encapsulating the core and comprising a polyelectrolyte matrix, wherein the shell is substantially insoluble in water and allows for the transport of the zinc cations to and from the core;
wherein the plurality of encapsulated electrochemically active particles are prepared by mechanically dispersing a plurality of electrochemically active material particles in association with a first polyelectrolyte solution comprising a first polyelectrolyte, and insolubilizing the first polyelectrolyte, wherein insolubilizing the first polyelectrolyte comprises adding a crosslinking agent to the first polyelectrolyte solution;
at least one conductive carbon; and
a binder.

7. The positive electrode of claim 6, wherein the plurality of encapsulated electrochemically active particles have a content that is from 45% to 95% by weight of a total weight of the active material layer, the binder has a content that is from 2% to 10% by weight of the total weight of the active material layer, and the at least one conductive carbon has a content that is from 3% to 45% by weight of the total weight of the active material layer, and wherein the sum of the content by weight of the plurality of encapsulated electrochemically active particles, the binder, and the at least one conductive carbon does not exceed 100%.

8. The positive electrode of claim 6, wherein the encapsulated electrochemically active particles have a content that is from 45% to 95% by weight of a total weight of the active material layer.

9. The positive electrode of claim 6, wherein the encapsulated electrochemically active particles have a content that is from 65% to 95% by weight of a total weight of the active material layer.

10. The positive electrode of claim 6, wherein the encapsulated electrochemically active particles have a content that is from 80% to 90% by weight of a total weight of the active material layer.

11. The positive electrode of claim 6, wherein the conductive carbon has a content is from 3% to 30% by weight of a total weight of the active material layer.

12. The positive electrode of claim 6, wherein the conductive carbon has a content that is from 5% to 15% by weight of a total weight of the active material layer.

13. The positive electrode of claim 6, wherein the electrochemically active material has a loading from 1.0 mg/cm$^2$ to 50 mg/cm$^2$.

14. The positive electrode of claim 6, wherein the electrochemically active material has a loading from 15 mg/cm$^2$ to 25 mg/cm$^2$.

15. A battery comprising:
a negative electrode comprising zinc, the zinc providing an active source of zinc ions;
an electrolyte comprising a zinc salt dissolved in water; and
the positive electrode of claim 6.

16. A method of preparing encapsulated particles for use in a positive electrode, the method comprising:
mechanically dispersing a plurality of electrochemically active material particles in association with a first polyelectrolyte solution comprising a first polyelectrolyte; and
insolubilizing the first polyelectrolyte in the presence of the mechanically dispersed plurality of electrochemically active material particles to generate the encapsulated particles, wherein each respective one of the encapsulated particles comprises a core of electrochemically active material for inserting zinc cations and a shell encapsulating the core, wherein the shell comprises a matrix of the first polyelectrolyte, and wherein the shell is substantially insoluble in water and allows for the transport of the zinc cations to and from the core.

17. The method of claim 16, wherein the insolubilizing the first polyelectrolyte comprises:
adding a crosslinking agent to the first polyelectrolyte solution to insolubilize the first polyelectrolyte at room temperature in the presence of the mechanically dispersed plurality of electrochemically active material particles.

18. The method of claim 16, wherein the first polyelectrolyte includes an acidic functional group comprising a polyelectrolyte acid, and wherein the insolubilizing the polyelectrolyte comprises:
adding a crosslinking agent comprising an alcohol functional group to the first polyelectrolyte solution in the presence of the mechanically dispersed plurality of electrochemically active material particles, the alcohol functional group comprising an alcohol;
evaporating the water at a temperature less than 100° C. to form a gel; and
drying the gel at a temperature above 100° C. to promote polyesterification between the polyelectrolyte acid and the alcohol.

19. The method of claim 16, further comprising adding a second layer to the shell by:
mechanically dispersing the encapsulated particles in association with a second polyelectrolyte solution comprising a second polyelectrolyte; and
insolubilizing the second polyelectrolyte in the presence of the encapsulated particles to add a second polyelectrolyte layer to the shell of the encapsulated particles.

20. The method of claim 19, wherein the second polyelectrolyte is the same as the first polyelectrolyte.

* * * * *